Patented Nov. 28, 1944

2,363,616

UNITED STATES PATENT OFFICE 2,363,616

ALDEHYDE COPOLYMER

Joseph C. Patrick, Morrisville, Pa., assignor to Thiokol Corporation, Trenton, N. J., a corporation of Delaware No Drawing. Application June 6, 1940,
Serial No. 339,076

8 Claims. (Cl. 260—42)

This invention relates to the production of polymeric bodies such as may be obtained by reacting an alkaline polysulphide with certain classes of organic compounds, and relates more particularly to the formation of copolymers.

Alkaline polysulphides can be reacted with organic compounds having two adjacent carbon atoms to each of which is attached a substituent which is split off during the reaction, e. g., ethylene and propylene dihalides, this reaction being described in Patrick Patent 1,890,181. Certain typical polymers of this class, while possessing the advantage of relatively low cost of production, have the disadvantage that during the curing thereof as such or in admixture with natural rubber, a disagreeable gas is evolved.

The disadvantage mentioned can be avoided and other marked improvements effected if the space between the adjacent carbon atoms referred to is opened up and intervening structure placed therein, and polymeric products are thereby obtained which are substantially polymers of the unit

Such polymers may be obtained by reacting an alkaline polysulphide with an organic compound having two carbon atoms joined to and separated by intervening structure to each of which carbon atoms there is attached a substituent which is split off during the reaction, as well as by other methods, as set forth, for example, in my copending application Serial No. 218,874, filed July 12, 1938, now U. S. Patent No. 2,216,044, issued September 24, 1940. The price paid for this advantage is however, in general, an increase in cost of production.

The two types of polymers described, that is, those of the adjacent carbon atom type and those of the intervening structure type, may be copolymerized by various methods as, for example, as set forth in my co-pending application Serial No. 267,389, filed April 12, 1939, and a corresponding cost advantage obtained. Unfortunately, however, certain typical representatives of these copolymers also possess the undesirable property of gas evolution previously mentioned. The adjacent carbon atom type of polymer and copolymers made therefrom possess the characteristic structure —C.C.SS.C.CSS— and the undesirable gas evolution appears to be traceable to this characteristic structure which, it will be noted, is absent from the intervening structure type of polymer.

It is an object of the present invention to produce a copolymer free from the disadvantageous gas evolution referred to.

It is a further object to produce a copolymer which combines the marked advantages of the "intervening structure" type of polymer with relatively low cost.

Other objects and advantages will hereinafter appear.

This invention is based, in part at least, on the discovery of the theory that the cause of the undesirable gas evolution from the adjacent carbon atom type of polymer is the presence of the recurring group

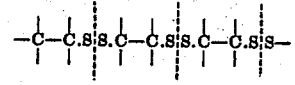

There is a tendency for this grouping to undergo a cleavage, as shown by the dotted lines, with the production of the obnoxious volatile compound

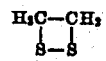

under reducing conditions which are present whether the compound is heated by itself or compounded with natural or other synthetic rubbers and organic plastics.

The present invention is an application of the above mentioned discovery and constitutes one means of avoiding the above mentioned recurring structure or unit, and by so doing I am enabled to obtain the desired absence of undesirable gas evolution in combination with high quality (measured by physical properties) and low cost.

I have good reason to believe that the above theory is correct. Whether correct or not, the fact is that the application of said theory has provided a solution of the long-standing problem of producing a polymer combining the following qualities (especially after curing):

A. The desired physical qualities of resistance to solvents, sunlight and ageing, high tensile strength and elasticity, etc.

B. Retention of these qualities over a wide range of temperature.

C. Freedom from undesirable gas evolution when worked.

D. Low cost.

The copolymers of this invention have the general formula

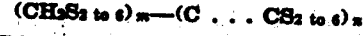

where C is a single carbon atom, C . . . C represents carbon atoms separated by intervening structure, S is a sulphur atom and $m$ and $n$ are integers the ratio of which signifies the molecular ratios of the radicals ($CH_2S_{2\ to\ 6}$) and $$(C \ldots CS_{2\ to\ 6})$$

The molecular weight is very high.

Such copolymers possess substantially all of the desirable properties of the "intervening structure type" polymer, including freedom from undesirable gas evolution. In addition they posssess certain additional advantages including increased resistance to solvents in general, as well as an improved or decreased water absorption. Last but not least they possess the outstanding advantage of relatively low cost as compared with the "intervening structure type" polymer.

The organic raw materials employed by the present invention include the following:

*Class A.*—Organic compounds in general having the formula

where

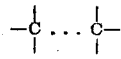

represents carbon atoms joined to and separated by intervening structure and X and X' represent substituents split off during the polysulfide reaction, in other words, organic compounds in general having two carbon atoms separated by and joined to intervening structure, each of said carbon atoms having joined thereto substituents split off during the polysulfide reaction.

These substances when reacted with an alkaline polysulfide produce polymers of the unit

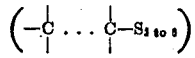

*Class B.*—Organic compounds having in general the formula

where R is a radical selected from the group consisting of a hydrogen atom, an alkyl radical, an aralkyl radical and an aryl radical.

In general the process of the present invention comprises reacting an alkaline polysulfide with a substance having the formula

to form a first polymer, reacting an alkaline polysulfide with a compound having the formula

where

represents carbon atoms joined to and separated by intervening structure and X and X' are substituents split off during the reaction, to form a second polymer and reacting the first and second polymers to form a copolymer.

The polymers can be separately made and reacted but are preferably made simultaneously or successively in the presence of each other and reacted with each other during the process of formation, because in this manner there is a reaction of the respective polymers in all possible degrees of polymerization and an intermingling of the reacted polymers in the resultant copolymeric entity.

Various typical methods of effecting the general reaction above described will be set forth below, it being understood that these are only illustrative.

1. Simultaneously react a metallic alkaline polysulfide with a class B compound and a class A compound.

2. React a metallic alkaline polysulfide with a class B body to form a polymer. Add more of the alkaline polysulfide, if necessary, and react therewith a class A compound to form a second polymer and combine the two polymers to form a copolymer.

3. Proceed as in 2 but reverse the order, i. e., first react a class A compound with polysulfide to form a first polymer, then a class B compound to form a second polymer and combine the first and second polymers to form a copolymer.

4. Proceed as in 2 or 3, but instead of adding additional polysulfide at the end of the first stage, employ polysulfide generated in the reaction. This may be done by adding a desulphurizing agent to the first formed polymer which will react therewith and remove labile sulphur and simultaneously will be converted into polysulfide. Such desulphurizing agent may, for example, be an alkaline monosulfide which as an incident of its desulphurizing action is converted into polysulfide.

All of these reactions are preferably carried out in dispersed condition in the presence of a suitable dispersion agent so as to obtain the products in the form of aqueous dispersions or latex-like liquids. The tremendous surface of the polymer in dispersed form facilitates interaction of the individual polymers to form copolymers.

The alkaline polysulfides in general may be used, that is, the di, tri, tetra and hexa sulfides of, for example, the alkali or alkaline earth metals and ammonium (and substituted ammonium), except that where the class B body reacts with and fixes ammonia (which its true of formaldehyde) a metallic alkaline polysulfide should be used and not ammonium polysulfide, for reaction with that body, and the rank or value of the sulphur integer in the polymer will, in general, correspond to that in the alkaline polysulfide, and in this way copolymers may be directly produced having the general formula

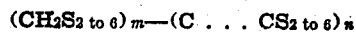

Where the alkaline polysulphide is the tri, tetra, penta or hexa sulphide, the formula of the resulting copolymer is

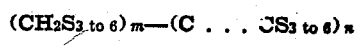

Such polymers contain sulphur in labile condition which may be removed by treatment with a desulphurizing agent, thus producing polymers which are wholly or partly in disulphide form as, for example, polymers having the formula

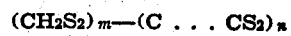

Such a copolymer may be obtained not only by partly desulphurizing a polymer made by the polysulphide reaction, but also may be obtained directly by the oxidation of suitable dimercapto bodies, and the resulting polymer in disulphide form may then be treated with elementary sulphur to convert it into a polymer having the formula

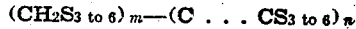

As a specific illustrative example the following will be given:

Example 1

4.2 mols of $Na_2S_4$ in the form of 2100 cc. of a two molar solution. Add to that 8 grams of sodium hydroxide (NAOH) and 20 grams of crystallized magnesium chloride ($MgCl_2.6H_2O$). The caustic soda and magnesium chloride are dissolved separately in a little water. The caustic and the magnesium chloride solutions are separately added to the polysulphide solution in the order named. The polysulphide mixture is contained in a suitable vessel or flask equipped with means for mechanical stirring and with a reflux condenser and thermometer. To this mixture, while being agitated, are added 2 mols of formaldehyde preferably in the form of a saturated solution of the gas in water containing about 37% by weight of the gas, i. e., about 160 to 165 grams of the aqueous formaldehyde solution, depending on its exact formaldehyde content. The mixture is then slowly heated to a temperature of 140° F. and 2 mols of BB' dichloro diethyl ether are then added at such a rate that about one hour is required for the complete addition of the dichloro diethyl ether, and the temperature of the mix is controlled in such a way that the heat of reaction does not result in temperatures greater than about 180° F. during the addition of the dichloro ether.

The reaction mix is then heated slowly to about 210–212° F. for about fifteen minutes to complete the reaction. The reaction product, which is in the form of a rather finely divided latex, is then allowed to settle and the supernatent liquid is withdrawn, after which the latex may be washed or purified by successive changes of water with intervening settling and decantation.

The polymer in the latex is in an intermediate form capable of being cured by a subsequent curing or heat treatment. For example, the intermediate polymer may be coagulated from the latex by the addition of sufficient acid to render the latex slightly acid in reaction, whereupon a coagulum is thrown down in massive form which can then be readily dried by treatment on differential rubber rolls or in a suitable masticator. Coagulation or separation of the polymer may also be effected by evaporating the water from the latex. The coagulated, dried intermediate polymer may then be subjected to a curing process which develops the inchoate properties of the intermediate polymer, and such a curing process will be illustrated by the following example.

The values of the ratio of $m$ to $n$ in the formula of the copolymer can be varied by varying the proportions of formaldehyde and BB' dichloro ethyl ether.

Example 2

|   | Parts by weight |
|---|---|
| 1. Polymer as above described | 100. |
| 2. Zinc oxide | 5. |
| 3. Benzothiazyl disulphide | .025 |
| 4. Stearic acid | .05 |
| 5. Carbon black | 50. |

The above components are thoroughly incorporated together as, for example, by working on rubber differential rolls, and the resulting compound is then subjected to curing by heating as, for example, in a mold under hydraulically imposed pressure to a temperature corresponding to about 40 pounds of steam or 287° F. for a period of about thirty minutes.

The curing greatly enhances and develops the inchoate physical properties of the intermediate potentially reactive polymer and produces a cured compound having mechanical and solvent resistance to a high degree. Instead of zinc oxide (2), metallic oxides and oxidizing agents in general may be employed and instead of stearic acid (4), acids in general may be used.

Some of the properties of the polymer produced as in Examples 1 and 2 may be listed as follows:

| Tensile strength | pounds per sq. in. | 1,800 |
|---|---|---|
| Elongation | per cent | 400 |
| Permanent set | do | 12 |

The material made in the above manner, when compounded and cured is not measurably swollen by a week's immersion in ordinary motor gasoline, nor does it impart color to the gasoline, and on a month's exposure to distilled water at a temperature of 120° F. the increase in weight due to water absorption is less than $1/100$ of 1%. A unique characteristic of the type of copolymer the preparation of which was given in Example 1, is that it may be mixed or combined in any proportion desired with natural rubber and the resulting compound cured or vulcanized without the formation, even at the high temperature of vulcanization, of any irritating gas or odor, and the products derived from such a mixture can be used for any purpose for which it might be desirable to use the rubber alone, because of the fact that no odor whatsoever is imparted to the rubber vulcanized by virtue of this admixture, although very desirable properties of another type as, for example, high resistance to swelling in solvents and high resistance to sunlight and air oxidation are conferred on the rubber mixes.

The copolymer produced as above described has physical properties all of which are at least as good as the polymer made from BB' dichloro ethyl ether by reaction with sodium polysulphide, and in some respects, particularly in respect of water absorption, there is an improvement. On the other hand, the cost of the copolymer is substantially less than that of the polymer made from the ether derivative alone.

The approximate empirical formula of the above described formula is

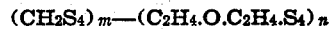

$$(CH_2S_4)_m — (C_2H_4.O.C_2H_4.S_4)_n$$

This polymer may be treated with a desulphurizing agent and converted into a polymer having the formula

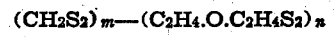

$$(CH_2S_2)_m — (C_2H_4.O.C_2H_4S_2)_n$$

The desulphurization step will be illustrated as follows:

Example 3

Proceed as in Example 1 and to the latex obtained as therein set forth, add 5 mols of NaOH dissolved in about 300 cc. of water. The latex mixture, which should be contained in a vessel fitted with mechanical agitation, is then stirred and is heated to about 200° F. for a period of about thirty minutes. Under this treatment the labile sulphur is removed from the organic compound by the caustic soda and a deep red polysulphide solution is formed by reaction of said labile sulphur with the sodium hydroxide desulphurizing agent. The agitator is then stopped and the latex is allowed to settle out from the liquid and thereafter a purified latex is obtained in the manner above described. Instead of alkaline hydroxides or monosulphides, desulphurizing agents in general may be employed including hydrosulphides, sulphites, hydrosulphites, etc.

The polymer from which the labile sulphur has been removed in the above manner possesses, upon curing, improved properties. For example, its tensile strength is higher; its resistance to abrasion is very markedly increased; its resistance to freezing is far greater than in the case of the untreated polymer. For example, where the untreated polymer would become stiff and may even become brittle at a temperature of about 5° below zero F., the polymer treated as above described is still flexible at temperatures as low as 40° below zero F. The treated polymer is also much more resistant to permanent deformation as a result of pressure, that is to say, its resistance to cold flow is greatly increased as a consequence of the removal of the labile sulphur.

The polymers obtained as in Examples 1 and 3 can also be obtained by numerous variations, some of which have been described above. For example, the polymer in disulphide form can be obtained by oxidizing a mixture of dimercapto methane, and BB′ dimercapto ethyl ether in an alkaline solution employing oxidizing agents in general as, for example, air, oxygen, ozone, sodium hypochlorite, hydrogen peroxide, alkaline bichromates, manganates, permangates and numerous other oxidizing agents, and the resulting polymer in disulphide form can then be treated with elementary sulphur, if it is desired to convert it into a polymer having a higher content of combined sulphur.

Instead of BB′ dichloro ethyl ether, the present invention employs, in general, organic compounds having two carbon atoms separated by and joined to intervening structure, said carbon atoms having joined thereto, respectively, substituents which are (a) capable of being split off during the polysulphide reaction, or (b) SH groups. These will be illustrated as follows:

*Table I—Intervening linkage characterized by an ether linkage*

$CH_3.CH_2X.O.CH_2X'.CH_3.$

AA′ disubstituted ethyl ether $X.C_2H_4.O.C_2H_4.X'.$

BB′ disubstituted ethyl ether $X.CH_2.O.CH_2.X'.$

Disubstituted methyl ether $X.C_2H_4O.C_2H_4.O.C_2H_4.X'.$

Disubstituted ethoxy ethyl ether $X.C_2H_4.S.C_2H_4.X'.$

Disubstituted thio ethyl ether $X.CH_2.S.CH_2.X'.$

Disubstituted thio methyl ether $$X.CH_2.O.CH_2.\underset{\underset{CH_3}{|}}{\overset{\overset{CH_3}{|}}{C}}.CH_2.OCH_2.X'.$$

Disubstituted 1, 3 methoxy, 2, 2 dimethyl propane $X.CH_2.CH_2.CH_2.O.CH_2.O.CH_2.CH_2.CH_2.X'.$ Disubstituted dipropyl formal $X.CH_2.CH_2.O.CH_2.O.CH_2.CH_2.X'.$ Disubstituted diethyl formal $$X.CH_2O.CH_2.\underset{\underset{X'}{|}}{CH}.OCH_3.$$

Disubstituted dimethoxy ethane

Disubstituted para diethoxy benzene $X.CH_2O.CH_2.CH_2.OCH_2.X'.$

Disubstituted dimethoxy ethane $X.CH_2.CH_2.CH_2.S.CH_2.CH_2.CH_2.X'.$

Disubstituted dipropyl thio ether pp′ Disubstituted diphenyl ether

Disubstituted anisole

Disubstituted dibenzyl ether aa′ Disubstituted diphenyl ether

Disubstituted para propyl dibenzyl ether $X.CH_2.CH_2.SO_2.CH_2.CH_2.X'.$

Disubstituted diethyl sulfone $X.CH_2.CH_2.CH_2.SO_2.CH_2.CH_2.CH_2.X'.$

Disubstituted dipropyl sulfone $CH_3.O.CH.CH_2.O.CH_2.O.CH_2.CH_2.O.CH_2.CH.O.CH_3$
$\quad\;\; X \qquad\qquad\qquad\qquad\qquad\qquad X'$ Disubstituted dimethoxy tetra ethylene glycol $$\underset{\underset{X}{|}}{CH_3.CH_2.CH}.O.\underset{\underset{X'}{|}}{CH.CH_2.CH_3}$$

AA′ disubstituted propyl ether $$\underset{\underset{X}{|}}{CH_2.CH_2.CH_2}.O.\underset{\underset{X'}{|}}{CH_2.CH_2.CH_2}$$

Gamma gamma disubstituted propyl ether $$\underset{\underset{X}{|}}{CH_3.CH.CH_2}.O.\underset{\underset{X'}{|}}{CH_2.CH.CH_3}$$

BB′ disubstituted propyl ether $$\underset{\underset{X}{|}}{CH_3.CH.CH_2}.O.\underset{\underset{X'}{|}}{CH.CH_2.CH_3}$$

Alpha beta disubstituted propyl ether $$\underset{\underset{X}{|}}{CH_3.CH_2.CH_2}.O.\underset{\underset{X'}{|}}{CH.CH_2.CH_3}$$

Alpha gamma disubstituted propyl ether $$\underset{\underset{X}{|}}{CH_3.CH_2.CH_2.CH}.O.\underset{\underset{X'}{|}}{CH.CH_2.CH_2.CH_3}$$

Alpha alpha disubstituted butyl ether $$\underset{\underset{X}{|}}{CH_3.CH_2.CH.CH_2}.O.\underset{\underset{X'}{|}}{CH_2.CH.CH_2.CH_3}$$

Beta beta disubstituted butyl ether $$\underset{\underset{X}{|}}{CH_3.CH.CH_2.CH_2}.O.\underset{\underset{X'}{|}}{CH_2.CH_2.CH.CH_3}$$

Gamma gamma disubstituted butyl ether $$\underset{\underset{X}{|}}{CH_2.CH_2.CH_2.CH_2}.O.\underset{\underset{X'}{|}}{CH_2.CH_2.CH_2.CH_2}$$

Delta delta disubstituted butyl ether

Table II—*Intervening linkage characterized by unsaturated hydrocarbon structure*

X.CH₂.CH=CH⟨  ⟩CH₂.X'

Disubstituted 3 tolyl propene 2

X.CH₂.CH=CH.CH₂.CH₂.X'

Disubstituted pentene 2

X.CH₂.CH=CH.CH₂.CH₂.CH₂.X'

Disubstituted hexene 2

X.CH₂.CH₂.CH=CH.CH₂.CH₂.CH₂.X'

1,7 disubstituted heptene 3

X.CH₂.CH₂.CH=CH.CH₂.CH₂.X'

1,6 disubstituted hexene 3

H₃C.CH=CH.CH.CH₃
     |  |
     X X'

1,4 disubstituted pentene 2

H₃C.CH₂.CH=CH.CH₂.CH.CH₃
 |       |
 X       X'

1,6 disubstituted heptene 3

Table III—*Intervening structure characterized by saturated hydrocarbon structure*

X.CH₂.CH₂.CH₂.X'

X.CH₂.(CH₂)ₙ.X'

(n may be 3 to 20 or more)

CH₃.CH₂.CH₂.CH₂.CH.CH₂.CH₃
     |   |
     X  X'

X.CH₂.CH.CH₂.X'
   |
   CH₃

X.CH₂.CH.CH₂.X'
   |
   CH₂
   |
   CH₃

Table IV—*Intervening structure characterized by aromatic structure*

Disubstituted ortho xylene

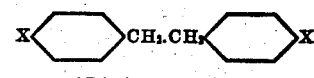

pp' Disubstituted diethyl benzene

aa' Disubstituted naphthalene

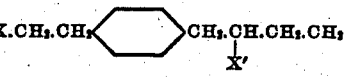

bb' Disubstituted naphthalene

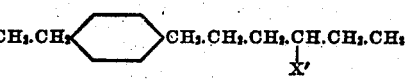

1,3 Disubstituted mesitylene

Disubstituted 1,4 dimethyl naphthalene

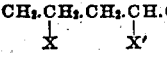

pp' Disubstituted dibenzyl

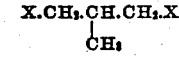

aa' Disubstituted anthracene

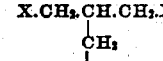

Disubstituted para ethyl butyl benzene

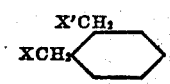

Disubstituted para hexyl propyl benzene

In the above listed compounds X and X' represent (a) substituents in general which are split off during the polysulphide reaction, for example, halogens, formate, acetate, propionate, butyrate, acid tartrate, acid citrate, sitrate, acid sulphate, acid phosphate, etc. and (b) SH for the mercapto reaction wherein the mercapto compounds are oxidized to produce polymers.

For some purposes the alkaline polysulphides of ammonium and substituted ammonium may be employed instead of the metallic polysulphides. In general it is preferred to use a metallic polysulphide in the reaction with formaldehyde. However, the formaldehyde may be reacted with a metallic polysulfide to form a first polymer and ammonium or substituted ammonium polysulfide may be reacted with the "intervening structure" compound to form a second polymer or vice versa and the two polymers reacted to form a copolymer.

Instead of formaldehyde the present invention employs, in general, organic compounds having the formula $$\overset{R}{\underset{}{HC}}=O$$

as already stated, examples of such bodies being as follows:

$$\overset{CH_3}{\underset{}{HC}}=O$$

Acetaldehyde $$\overset{CH_3}{\underset{HC=O}{(CH_2)_n}}$$

Various homologens of formaldehyde $$\overset{CH_2}{\underset{CHO}{CH}}$$

Acrolein $$\overset{CH_3}{\underset{CHO}{\overset{CH}{\underset{CH}{}}}}$$

Crotonaldehyde

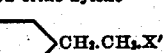

Furfural

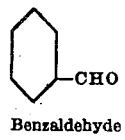

Benzaldehyde

This application is a continuation in part of copending application Serial No. 267,389.

I claim:

1. The process which comprises reacting an alkaline metallic polysulphide with a substance having the formula

where R is selected from the group consisting of a hydrogen atom, an alkyl radical, an aralkyl radical and an aryl radical, to form a first polymer, reacting an alkaline polysulphide with a compound having the formula

where

represents carbon atoms joined to and separated by intervening structure and X and X' are substituents split off during the reaction, to form a second polymer, and reacting the first and second polymers to form a copolymer.

2. The process which comprises reacting an alkaline metallic polysulphide with an organic compound having the formula

where R is selected from the group consisting of a hydrogen atom, an alkyl radical, an aralkyl radical and an aryl radical to form a first polymer and reacting an alkaline metallic polysulphide and an organic compound having the formula

where

represents carbon atoms joined to and separated by intervening structure, and X and X' are substituents split off during the reaction, to form a second polymer and reacting said polymers to form a copolymer.

3. The process which comprises reacting an alkaline metallic polysulphide with formaldehyde to form a first polymer, reacting an alkaline polysulphide with an organic compound having two carbon atoms separated by and joined to intervening structure, said carbon atoms having joined thereto substituents which are split off during the reaction, to form a second polymer and reacting the first polymer with the second polymer to form a copolymer.

4. The process which comprises reacting an alkaline metallic polysulphide with formaldehyde to form a first polymer, reacting an alkaline polysulphide with an organic compound having two carbon atoms separated by and joined to intervening structure, said carbon atoms having joined thereto substituents which are split off during the reaction to form a second polymer, reacting the first polymer with the second polymer to form a copolymer and treating the resulting copolymer with a desulphurizing agent.

5. The process which comprises reacting an alkaline metallic polysulphide with formaldehyde and an organic compound having two carbon atoms separated by and joined to intervening structure, said carbon atoms having joined thereto, respectively, substituents which are split off during reaction, to form polymers and reacting said polymers to form a copolymer.

6. The process which comprises reacting an alkaline metallic polysulphide with formaldehyde and an organic compound having two carbon atoms separated by and joined to intervening structure, said carbon atoms having joined thereto, respectively, substituents which are split off during reaction to form polymers and reacting said polymers to form a copolymer and reacting said copolymer with a desulphurizing agent.

7. The process which comprises reacting an alkaline metallic polysulphide with formaldehyde to make a first polymer, reacting BB' dichloro ethyl ether with an alkaline polysulphide to make a second polymer and reacting the first and second polymers to form a copolymer.

8. The process which comprises reacting an alkaline metallic polysulphide with formaldehyde and BB' dichloro ethyl ether to form polymers and reacting said polymers to make a copolymer.

JOSEPH C. PATRICK.